UNITED STATES PATENT OFFICE.

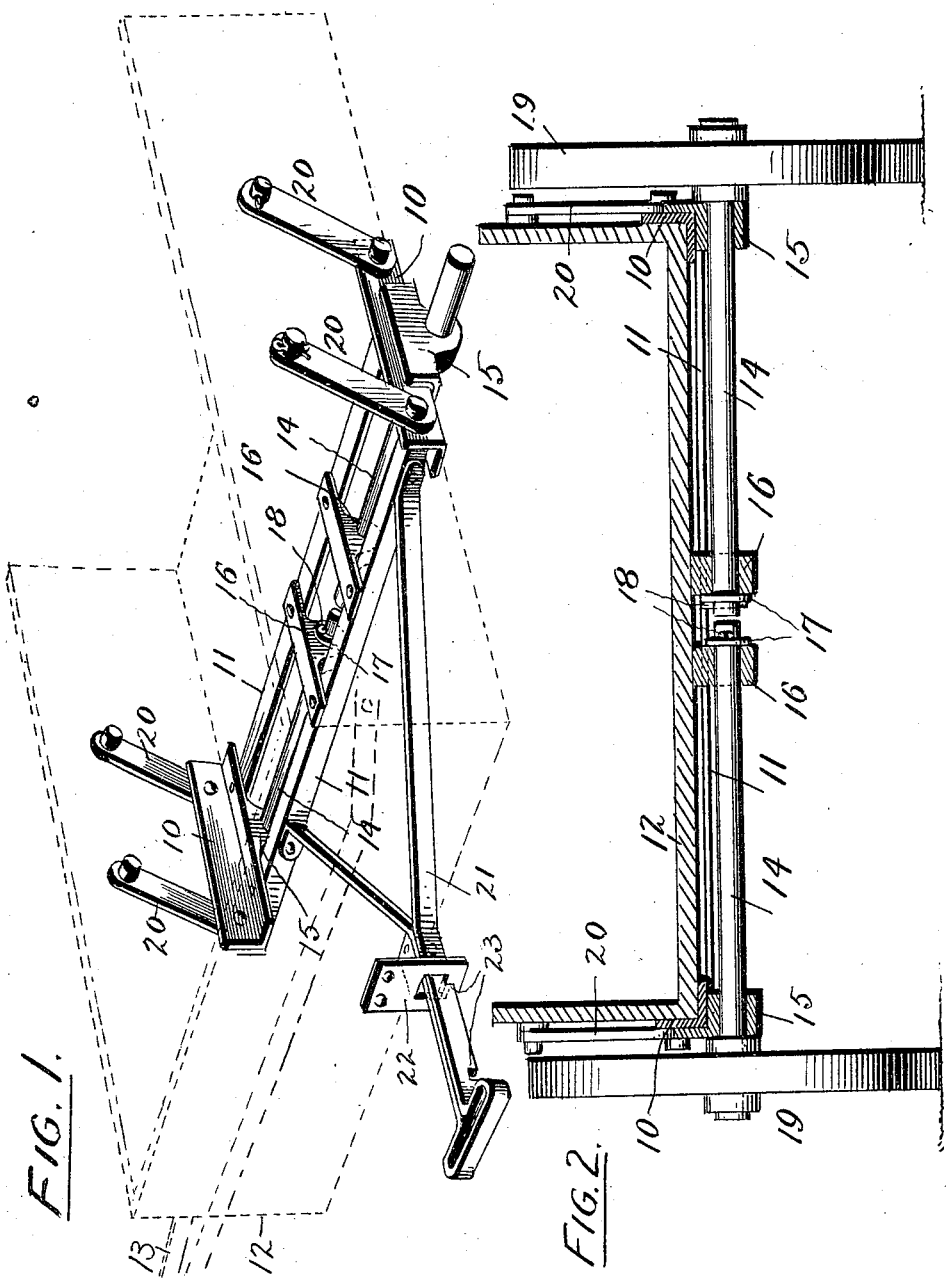

JAMES ZERA BENEDICT, OF FARLEY, IOWA.

HAND-CART.

1,129,539.

Specification of Letters Patent.

Patented Feb. 23, 1915.

Application filed February 13, 1912. Serial No. 677,336.

*To all whom it may concern:*

Be it known that I, JAMES Z. BENEDICT, a citizen of the United States, residing at Farley, in the county of Dubuque and State of Iowa, have invented certain new and useful Improvements in Hand-Carts, and do hereby declare that the following is a full, clear, and exact description of the same, reference being had to the annexed drawings, making a part of this specification, and to the letters and figures of reference marked thereon.

The object of my invention is to provide a hand cart which may be put to a great variety of uses, such, for example, a litter carrier, a wheel barrow, a house truck, etc., whose framework will while a few parts possess all required strength and which will have the capacity for shifting the load forward or back with reference to the axle to suit the requirements of the particular cases, and which will have such construction of wheel axle as will allow the differential movement required in making a turn, and to this end my invention consists in the hand cart constructed substantially as hereinafter specified and claimed.

In the accompanying drawings Figure 1 is a perspective view of the framework of my cart, the box or body being shown in dotted lines; and Fig. 2 is a cross section on a plane passing through the axle.

The frame of my cart is composed of two similar side bars 10, of angle iron, that are comparatively short, and two parallel transverse bars 11, of angle iron, to which the two side bars are riveted at the ends so that the horizontal flanges of the two side bars turn inward and are adapted to support between the two vertical flanges the cart body or box 12, which at one end has a suitable handle 13 for the propulsion of the vehicle. Situated midway between the two transverse bars 11, is a divided axle composed of two solid shafts 14 placed in alinement, for each of which there is a box 15 secured to a side bar 10, and a box 16 a short distance to one side of the transverse center of the cart and the free end of the shaft projecting toward the center has a washer 17 on the inner side of the centrally located box, and a cotter pin 18 to secure the shaft in place. On the outer end of each shaft section is a rigidly fixed carrying wheel 19. It will be seen that the two carrying wheels are capable of independent revolution since each is mounted on its own shaft section, and hence, the differential movement, when the cart makes a turn, is provided for, and yet the construction is a simple and strong one.

The cart body or box 12 has at each side a pair of parallel links 20 pivotally connected at their upper ends thereto, and pivotally connected at their lower ends to the contiguous side bars 10, the points of pivotal connection being such that when the bottom of the box or body rests on the side rails 10, the links will stand at an angle. It will be seen that by moving the axle frame longitudinally, that is either from front to rear, or from back to front, its position with reference to the loaded cart box may be shifted so that the load may be carried either wholly in front of the axle or wholly in rear thereof. This operation can be easily effected, as the wheels will roll easily, and yet, at all times the load rests on the side bars 10. For convenience in manipulation, a brace-form handle 21 is provided, having forwardly diverging legs, and is attached, where its legs are farthest apart, to one of the cross bars 11. The shank portion of said handle passes through a slot in a plate 22 fastened to the end of the cart body or box, and two notches 23 are preferably provided in the underside of said shank portion of the handle to serve as a latch device, but I do not limit myself to any particular construction of latching device. But little occasion for a latch exists because the tendency of the cart body or box is to remain in either of the two adjusted positions of the axle. In addition to the structural advantages from my divided axle construction, such construction conduces to reduction in the total external width of the cart.

Having thus described my invention what I claim is—

A cart comprising in combination with a pair of wheels, a frame composed of a pair of cross bars and a parallel pair of short angle plates mounted upon the ends of the cross bars, axle hangers carried by the said end plates, a pair of parallel links pivoted at their lower ends to the vertical flange of each angle plate, a cart body having its sides pivotally poised upon the upper ends of the links suspended between the respective pairs, the bottom of the body resting upon the horizontal flanges of the angle plates and the sides of the body engaging the vertical flanges of said angle plates, and a handle attached to the frame projecting beyond the end of the body.

In testimony whereof I affix my signature in presence of two witnesses.

JAMES ZERA BENEDICT.

Witnesses:
  FRED D. BARTON,
  COUNT GIBBS.

Copies of this patent may be obtained for five cents each, by addressing the "Commissioner of Patents, Washington, D. C."